United States Patent
Johnson et al.

[11] Patent Number: 5,732,972
[45] Date of Patent: Mar. 31, 1998

[54] COLD DEPLOYMENT PYROTECHNIC INFLATOR FOR AIR BAG SYSTEMS

[75] Inventors: Darrin L. Johnson, Uintah Highlands; David W. Lindsey, Ogden; Scott A. Jackson, Centerville; Kerry C. Walker, Perry; Eugene R. Dearden, Clearfield, all of Utah

[73] Assignee: Morton International, Inc., Chicago, Ill.

[21] Appl. No.: 631,724

[22] Filed: Apr. 10, 1996

[51] Int. Cl.$^6$ .................................. B60R 21/26
[52] U.S. Cl. .................. 280/737; 280/741; 102/531; 222/3
[58] Field of Search .................. 280/737, 736, 280/741, 742, 740; 102/530, 531; 222/3; 137/68.13

[56] References Cited

U.S. PATENT DOCUMENTS 3,756,621  9/1973  Lewis et al. ...................... 280/741
3,786,843  1/1974  Stephenson et al. ................ 280/737
5,301,979  4/1994  Allard ............................ 280/737
5,441,302  8/1995  Johnson et al. ................... 280/737

FOREIGN PATENT DOCUMENTS

95/34448  12/1995  WIPO.

Primary Examiner—Peter C. English
Attorney, Agent, or Firm—Gerald K. White

[57] ABSTRACT

A passenger air bag inflator using pressurized inert gas upon initial deployment to provide cool gas to the folded air bag. After the bag has started to unfold, the remaining gas is provided by pyrotechnic gas generant. Pyrotechnic gas expands against a piston. The piston compresses the inert gas and forces it to exhaust from the inflator. Upon expulsion of the inert gas, the piston then becomes a filter for the pyrotechnic. The system provides a reduction in air bag stresses from fast hot gas deployments.

12 Claims, 1 Drawing Sheet

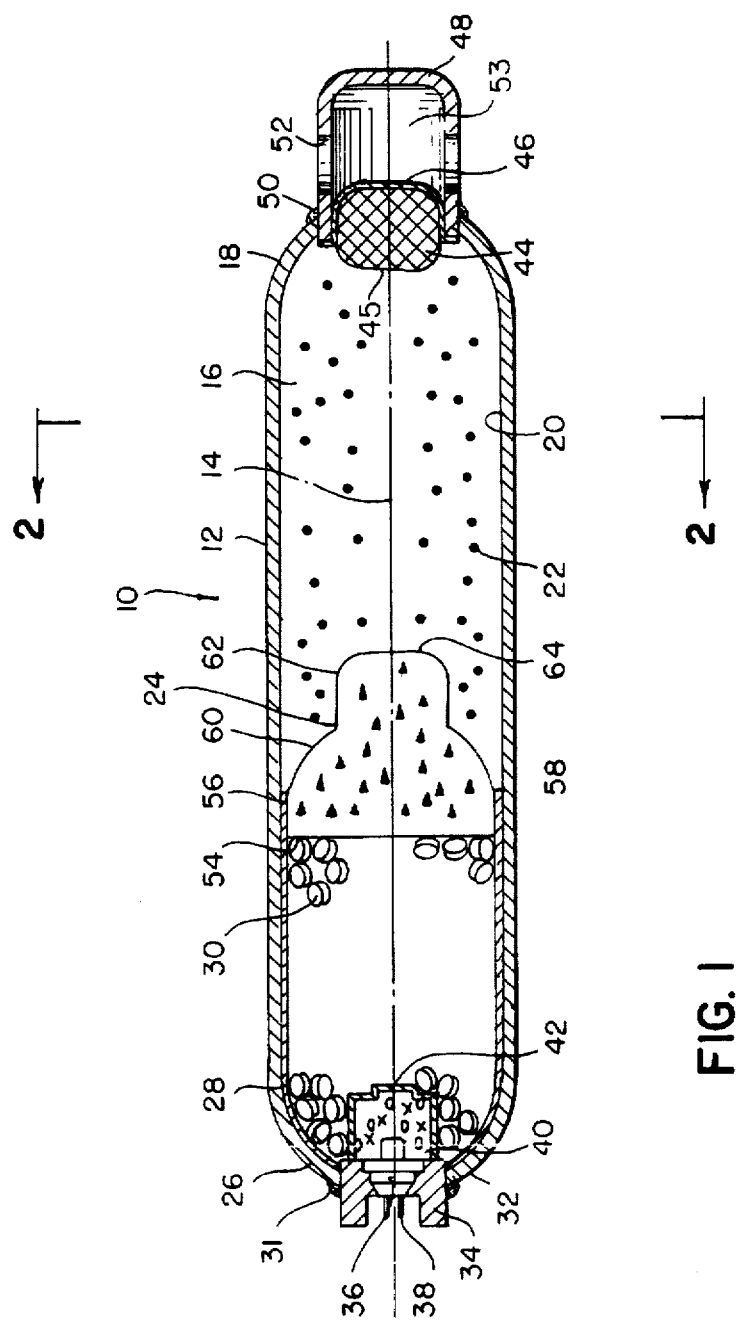
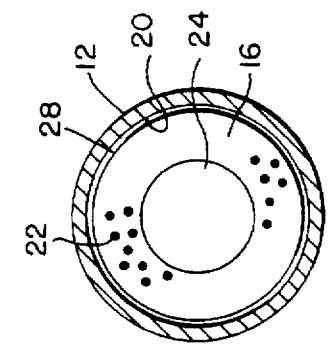

COLD DEPLOYMENT PYROTECHNIC INFLATOR FOR AIR BAG SYSTEMS

BACKGROUND OF THE INVENTION

1. Field of the Invention

The present invention relates to a passenger air bag inflator, and more particularly, to an inflator that is operative, upon initial deployment, to provide a low temperature inert gas to a folded inflatable air bag, with completion of the deployment being accomplished by higher temperature gas provided by a pyrotechnic gas generant.

2. Description of the Related Art

An inflatable air bag is a safety device for protecting automotive vehicle occupants in a collision. When the vehicle strikes or is struck by a harm producing object, a sensor detects the change in motion and fires a detonator. This releases gas under high pressure from an inflator into a folded inflatable air bag. The air bag expands and provides a protective cushion that restrains the driver or passenger against various impact conditions.

Many types of inflators have been disclosed in the art for inflating an air bag for use in an inflatable restraint system. One involves the utilization of a quantity of stored compressed inert gas which is selectively released at the stored temperature to inflate the air bag. Another derives a gas source from a combustible gas generating material which, upon ignition, generates a quantity of hot gas sufficient to inflate the air bag. In a third type, the air bag inflating gas results from a combination of stored compressed inert gas and a gas generating material. The last mentioned type, commonly referred to as an augmented gas or hybrid inflator, delivers hot gas to the air bag.

As disclosed in U.S. Pat. No. 3,756,621 granted to Donald J. Lewis, et al. on Sep. 4, 1973, the use of a stored quantity of compressed argon, an inert gas, is advantageous. Compressed air and compressed nitrogen have specific problems related to their use. Air is not inert and when compressed to relatively high pressure becomes a source of significant hazard. Nitrogen is relatively inert when compressed but contributes to the production of nitrogen oxide especially when intermixed with hot gases generated from combustion.

The inflator may comprise a quantity of high pressure inert gas in a storage cylinder or bottle. An advantage accrues, however, where a stored compressed gas augmented by a generated gas is utilized. This advantage involves the addition of energy to the stored compressed gas to aid in filling of the air bag. Current technology with hybrid inflators to obtain this advantage is to heat the stored high pressure gas with some type of pyrotechnic. Such hybrid inflators, however, are subject to a disadvantage, even when argon is used as the stored compressed gas, because the gas delivered to inflate the air bag is hot and is intermixed with a gas produced by combustion of the pyrotechnic. Such systems fill air bags with some type of gases, particulates or smoke that can be irritating or noxious. Additionally, such systems introduce undesirable air bag stresses that tend to be caused by too fast hot gas deployments.

U.S. Pat. No. 5,301,979 granted to John E. Allard, and assigned to the assignee of the present invention, discloses an inflator that delivers cold pressurized pure inert gas to an inflatable air bag with the addition of purely mechanical energy to aid in filling the air bag. Since a cold, that is, a low ambient temperature, gas is used to inflate the air bag, the Allard inflator avoids the introduction of air bag stresses that are caused by too fast hot gas initial deployments. This inflator comprises a high strength cylindrical container that is filled with a stored pure compressed or pressurized inert gas such as argon or nitrogen. A piston is located at one end of a cylindrical section with a high energy pyrotechnic material behind it. Both sides of the piston are at the same pressure during storage. An initiator that is arranged to be activated by a vehicle collision sensor is located in the high energy pyrotechnic material. A burst disk is located at the opposite end of the cylindrical section. The piston is driven down the length of the cylindrical section when the pyrotechnic material is ignited. When the pressure in the container exceeds the burst disk strength, the pure inert gas therein expands at the stored temperature thereof into the air bag.

There is a need and a demand for improvement in inflators to the end of overcoming the foregoing disadvantages and by providing an inflator that uses stored cool pressurized inert gas to provide low temperature, inert gas upon initial deployment to a folded inflatable air bag, with completion of the deployment being accomplished by gases at a higher temperature that are provided by a pyrotechnic gas generator.

SUMMARY OF THE INVENTION

It is an object of the present invention to provide an improved method for deploying a folded inflatable air bag without having to contend with the disadvantages discussed above.

A more specific object of the invention is to provide an improved method of inflating an inflatable folded air bag that utilizes pure cool inert gas to effect air bag initial deployment, and after the air bag has started to unfold, completing the deployment by utilizing filtered, higher temperature gas, thereby to avoid the disadvantages discussed above including the introduction of air bag stresses that are caused by too fast hot gas initial deployment.

Another object of the present invention to provide an inflator that meets the needs of initial deployment to provide cool, that is, a low temperature, gas to a folded air bag without the disadvantages discussed above, and after the air bag has started to unfold, effecting completion of the deployment utilizing filtered higher temperature gas provided by a pyrotechnic gas generant.

In accomplishing these and other objectives of this invention, stored pressurized inert gas is used to initiate deployment of a folded air bag With low temperature gas. Completion of the deployment is accomplished by higher temperature gases provided by a pyrotechnic gas generant. The pyrotechnic gas generant is physically separated from the inert gas chamber by a porous piston which functions as a filter for removing particulates from the gas produced by the pyrotechnic gas generant and transfers pressure from the pyrotechnic gas chamber to the inert gas chamber by sliding axially, compressing the inert gas chamber which initiates rupturing of a containment barrier in the inert gas chamber to release the gases into the air bag.

The novelty of this invention is the process of releasing the stored compressed inert gas prior to the release of the gas produced by the pyrotechnic material. This process provides a unique advantage of preventing air bag damage from excessive temperatures at the critical initial deployment stage of operation. The hotter pyrotechnic gases are then utilized after the initial deployment at temperatures higher than would otherwise be practicable. By providing a system which can utilize higher gas temperatures, less pyrotechnic gas generant is required and the required filter materials for gas cooling are reduced, thereby reducing the cost and complexity of the overall design. This invention offers additional advantages over standard inert gas hybrid inflators of performance tailorability and cleanliness provided by pyrotechnic inflators.

This invention provides an alternative hybrid type inflator utilizing common technology of pyrotechnic gas generant materials. Gas expulsion provided by the piston movement enhances the output capability of the inflator upon ignition. Initial release of cold gas during air bag breakout, that is, unfolding reduces potential air bag damage.

Gas generant material currently in the pellet, tablet or wafer configuration can be used thus reducing the risk inherent with development of other processing systems. The invention provides rapid air bag deployment with a lower pressure rise rate and thus reduced air bag stresses. The invention also offers reduced gas generant and filter costs over current pyrotechnic inflators and provides better performance tailoring ability and cleaner gas effluent than current hybrid inflators.

The various features of novelty which characterize the invention are pointed out with particularity in the claims annexed to and forming a part of this specification. For a better understanding of the invention, its operating advantages, and specific objects attained by its use, reference is made to the accompanying drawing and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, and of which:

FIG. 1 is a cross sectional side view illustrating the inflator of the present invention; and FIG. 2 is a cross sectional view taken along the lines 2—2 of FIG. 1.

DESCRIPTION OF THE PREFERRED EMBODIMENT

Illustrated in FIGS. 1 and 2 of the drawings is an inflator assembly 10 for inflating a vehicle occupant restraint such as an inflatable air bag (not shown). The inflator assembly 10 comprises a high strength container or bottle 12 having a central elongated axis 14 along which a chamber 16 is defined. Included within the chamber 16 extending therein for a substantial distance from a concave gas output first end 18 of the container 12 is an elongated cylindrical section 20 that is filled with a pure pressurized inert gas (i.e., argon, nitrogen) 22. Positioned in the end of the cylindrical section 20 that is remote from the first end 18 of the container 12 is a porous filter piston 24. Provided in the chamber 16 between the piston 24 and a concave second end 26 of the container 12 and retained in a pouchlike protective layer 28 of suitable material is a high energy pyrotechnic gas generating material 30 which may be in pellet, tablet or wafer form. A portion of the piston 24 extends within the protective layer 28 and serves as a closure cap to retain the gas generating material 30 therein.

Sealed in the concave second end 26 of the container 12 by a weld 31 is an inflator initiator 32. The initiator 32 functions both to provide a sealed closure for the concave second end 26 of the container 12 as well as to ignite the pyrotechnic gas generating material 30 which is combustible. The initiator 32 comprises a housing 34, containing a conventional electrically actuated squib 36 having a pair of electrical energizing terminals 38, pyrotechnic ignition compound 40 in which the squib 36 is located, and a rupturable seal plate or disk 42.

The pyrotechnic gas generant material 30 may be one of any number of compositions meeting the requirements of burning rate, non-toxicity and flame temperature. One composition which is utilized, in a preferred embodiment of the invention, is that described in U.S. Pat. No. 4,203,787 to Kirchoff et al. which is assigned to the assignee of the present invention, the disclosure of which patent is incorporated herein by reference. Particularly preferred are compositions comprising from about 65 percent by weight to about 70 percent by weight metal azide up to about 4 percent by weight sulfur and from about 27 percent to about 33 percent by weight molybdenum disulfide, especially a composition comprising about 68 percent by weight sodium azide, about 3 percent by weight sulfur, and about 30 percent by weight molybdenum disulfide.

A cylindrically shaped damper 44, more specifically a device to reduce the amplitude of a series of waves, and an end cap 46 are located in the opposite end of the container 12, that is, in the concave first end 18. The damper 44 includes a planar surface 45 that is provided at substantially a 90° angle with respect to the central axis 14. The end cap 46 is a containment barrier that seals the inert gas in the cylindrical section 20 of chamber 16 from a diffuser 48 and an outlet 53 that are in communication with an inflatable air bag (not shown) to be inflated. The periphery of the diffuser 48 is sealed to the first end 18 of the container 12 by a weld 50. A plurality of opposed orifices or ports 52 of outlet 53 are provided in the diffuser 48.

The pyrotechnic gas generant material 30 is physically separated from the inert gas in cylindrical section 20 by the porous piston 24. The piston 24 functions as a filter for removing particulates from the gas generated by the pyrotechnic material 30 and transfers pressure from the portion of chamber 16 containing pyrotechnic material 30 to the cylindrical section 20 portion thereof containing the inert gas by sliding axially. This compresses the inert gas in the cylindrical section 20 which initiates rupture of the end cap or containment barrier 46. This effects the release of the stored inert gas through the diffuser 48. The stored inert gas then expands into the air bag (not shown).

In outward form or construction the porous filter piston 24, as shown in FIG. 1., includes a planar surface 54 that is positioned at substantially a 90° angle with respect to the central axis 14 in the container 12. The planar surface 54 of the piston 24 and a cylindrical surface portion 56 thereof are positioned within the end 58 of the pouchlike protective layer 28, with the surface 54 being held by the pressure of the pressurized stored inert gas in cylindrical section 20 in firm physical contact with the gas generating composition 30. This minimizes any tendency for the pellets, tablets or wafers to rattle and fracture. In outward form the piston 24 further includes an inwardly curving wall 60 with the axis 14 centrally thereof and matching the shape of the inner wall of the concave first end 18 of the container 12. Extending from the surface portion 60 with the axis 14 also central thereto in the piston 24 is a solid cylindrically shaped portion 62 having a diameter that is approximately the same as that of the damper 44. Included in the cylindrically shaped portion 62 of the piston 24 is a second planar surface 64 that is positioned at substantially a 90° angle with respect to the central axis 14.

When the inflator initiator 32 is activated, the piston 24 is moved, that is driven, with a pumping movement down the length of the cylindrical section 20 to the first end 18 of the container 12. Pyrotechnic gas generated by the gas generating material 30, when the latter has been ignited by electrical activation of the squib 36, expands against the porous filter piston 24. The resulting movement of the piston 24 compresses the inert gas in the cylindrical section 20 and forces it to exhaust through the diffuser 48 of the inflator assembly 10. Upon expulsion of the inert gas in cylindrical section 20 the piston 24 then becomes a filter for the hot gas generated by the pyrotechnic gas generating material 30. The temperature of this generated gas is significantly higher than that of the stored cool inert gas that had been in the inflator cylindrical section 20. Thus, upon initial deployment of the air bag cool stored inert gas flows into the air bag. This flow of cool gas is followed by a flow of hot gas produced by ignition of the gas generating material 30. Thus, the assembly 10 provides a reduction in air bag stresses from fast hot gas deployments.

The energy added to the inflator assembly 10 by the movement of the piston 24 down the length of the cylindrical section 20 aids in filling the air bag (not shown) with the cool pure inert gas that had been stored in the cylindrical section 20. Such energy is purely mechanical and does not cause admixture with the pure inert gas of other gases or particulates.

The outlet ports 52 throttle the flow of the cool pure inert gas, providing the proper fill rate for the air bag during the initial deployment thereof.

The hotter pyrotechnic gases generated by burning of the gas generant material 30 is then utilized after the initial deployment of the air bag. These generated gases flow through the porous filter piston 24 and are filtered. Thus, a feature of the invention is the process of releasing to the air bag the compressed inert gas prior to the gas produced by the pyrotechnics. This provides the unique advantage of preventing air bag damage from excessive temperatures at the critical initial deployment stage of operation. That is to say initial release of cold gas during air bag breakout (unfolding of the air bag) reduces potential bag damage.

The hotter pyrotechnic gases are then utilized after the initial deployment at temperatures higher than would otherwise be practicable. By providing a system that can then utilize higher gas temperatures, less pyrotechnic gas generant is required and the required filter materials for gas cooling are reduced. This reduces the cost and complexity of the overall design. The invention offers the additional advantage over inert gas hybrid inflators of known current technology of performance tailorability and cleanliness provided by pyrotechnic inflators.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An inflator for delivering pure inert cold gas to an air bag during initial deployment thereof and for delivering hot gas provided by a pyrotechnic gas generant material to said air bag to complete the deployment thereof, comprising:

a container in which a pressurized cold pure inert gas is stored, said container having a first end and a second end, said container including a cylindrical section positioned between said first end and said second end and having an outlet positioned at said first end, an end cap at said first end of said container comprising a containment barrier that seals said pure inert gas in said cylindrical section from said outlet, a porous piston in sealed slidable relation over substantially the full length of said cylindrical section of said container, said piston during storage of said cold pure inert gas in said container being positioned at an end of said cylindrical section that is remote from said first end of said container, pyrotechnic means positioned between said piston and the second end of said container, and means for activating said pyrotechnic means.

2. An inflator as defined by claim 1 wherein said means for activating said pyrotechnic means is an initiator.

3. An inflator as defined by claim 1 wherein said pyrotechnic means is positioned in a protective layer with a portion of said piston extending within said protective layer, whereby said piston serves as a closure cap to retain said pyrotechnic means within said protective layer.

4. An inflator as defined by claim 3 wherein said pyrotechnic means comprises a gas generant material.

5. An inflator as defined by claim 4 wherein said gas generant material is in tablet form.

6. An inflator as defined by claim 4 wherein said gas generant material is in wafer form.

7. An inflator as defined by claim 4 wherein said container includes a central axis along which said cylindrical section, said porous piston and said pyrotechnic means are uniformly positioned, and wherein said piston includes a planar surface that is positioned at substantially a 90° angle with respect to said central axis, which planar surface in substantially the entirety thereof extends within said protective layer and is in physical contact with said gas generant material.

8. An inflator as defined by claim 7 wherein an inner wall of said container at said first end thereof is concave in shape, and wherein said porous piston in outward form further includes an inwardly curving wall that matches the shape of said inner wall of said concave first end of said container.

9. An inflator as defined by claim 8 further including a damper means for reducing the amplitude of a series of waves that are produced as said porous piston is rigorously pumped into engagement with said containment barrier.

10. An inflator as defined by claim 9 wherein said porous piston further includes a solid cylindrical shaped portion having a second planar surface that is positioned at substantially a 90° angle with respect to said central axis, and wherein said damper means includes a planar surface that is approximately the same size as said second planar surface of said piston and also is positioned at substantially a 90° angle with respect to said central axis.

11. An inflator for delivering pure inert cold gas to an air bag during initial deployment thereof and for delivering hot gas provided by a pyrotechnic gas generant material to said air bag to complete the deployment thereof, comprising:

a container in which a pressurized cold pure inert gas is stored, said container having a first end and a second end, said container including a cylindrical section positioned between said first end and said second end and having an outlet positioned at said first end, an end cap at said first end of said container comprising a containment barrier that seals said pure inert gas in said cylindrical section from said outlet, a porous piston in sealed slidable relation over substantially the full length of said cylindrical section of said container, said piston during storage of said cold pure inert gas in said container being positioned at an end of said cylindrical section that is remote from said first end of said container, pyrotechnic means positioned between said piston and the second end of said container, and means for activating said pyrotechnic means, wherein said means for activating said pyrotechnic means is an initiator, wherein said pyrotechnic means is positioned in a protective layer with a portion of said piston extending within said protective layer, whereby said piston serves as a closure cap to retain said pyrotechnic means within said protective layer, wherein said pyrotechnic means comprises a gas generant material, wherein container includes a central axis along which said cylindrical section, said porous piston and said pyrotechnic means are uniformly positioned, and wherein said piston includes a planar surface that is positioned at substantially a 90° angle with respect to said central axis, which planar surface in substantially the entirety thereof extends within said protective layer and is in physical contact with said gas generant material, wherein an inner wall of said container at said first end thereof is concave in shape, and wherein said porous piston in outward form further includes an inwardly curving wall that matches the shape of said inner wall of said concave first end of said container, further including a damper means for reducing the amplitude of a series of waves that are produced as said porous piston is rigorously pumped into engagement with said containment barrier, and wherein said porous piston further includes a solid cylindrical shaped portion having a second planar surface that is positioned at substantially a 90° angle with respect to said central axis, and wherein said damper means includes a planar surface that is approximately the same size as said second planar surface of said piston and also is positioned at substantially a 90° angle with respect to said central axis.

12. An inflator for delivering pure inert cold gas to an air bag during initial deployment thereof and for delivering hot gas provided by a pyrotechnic gas generant material to said air bag to complete the deployment thereof, comprising:

a container having a first end and a second end, said container including a cylindrical section, positioned between said first end and said second end, in which a pressurized cold pure inert gas is stored, and having a diffuser positioned in said first end, a containment barrier that seals said stored inert gas in said cylindrical section from said diffuser, pyrotechnic means positioned in said container adjacent said second end, a porous filter piston positioned in said container at an end of said cylindrical section that is remote from said first end of said container, said piston physically separating said pyrotechnic means from said stored inert gas and positioned in slidable relation over substantially the full length of said cylindrical section, and initiating means for activating said pyrotechnic means, whereby, upon activation of said pyrotechnic means, said piston is driven down the length of said cylindrical section to increase the pressure of the inert gas in said cylindrical section, and when the pressure in said cylindrical section exceeds the burst strength of said containment barrier said containment barrier ruptures and allows the pressurized cold pure inert gas in said cylindrical section to exhaust through said diffuser to an air bag to effect the initial inflation deployment thereof, whereby upon expulsion of the inert gas, said porous filter piston becomes a cooler and a filter for the hot pressurized generated gas that is produced by said pyrotechnic means which generated gas is cooled and filtered and then expands into the air bag to complete the deployment thereof.

* * * * *